United States Patent
Mudric

(10) Patent No.: US 10,270,737 B2
(45) Date of Patent: Apr. 23, 2019

(54) EXTENDING NETWORK ADDRESS LIFETIME WHEN ADDRESS SYSTEM IS UNAVAILABLE

(71) Applicant: Avaya Inc., Basking Ridge, NJ (US)

(72) Inventor: Dusan Mudric, Ottawa (CA)

(73) Assignee: Avaya Inc., Basking Ridge, NJ (US)

( * ) Notice: Subject to any disclaimer, the term of this patent is extended or adjusted under 35 U.S.C. 154(b) by 287 days.

(21) Appl. No.: 15/080,945

(22) Filed: Mar. 25, 2016

(65) Prior Publication Data

US 2017/0279765 A1    Sep. 28, 2017

(51) Int. Cl.
    G06F 15/16    (2006.01)
    H04L 29/12    (2006.01)
    H04L 12/26    (2006.01)
(52) U.S. Cl.
    CPC ...... H04L 61/2053 (2013.01); H04L 61/2015 (2013.01); *H04L 43/0811* (2013.01); *H04L 61/6059* (2013.01)
(58) Field of Classification Search
    CPC ............. H04L 61/2053; H04L 43/0811; H04L 61/2015; H04L 61/6059
    USPC ......................................................... 709/245
    See application file for complete search history.

(56) References Cited

U.S. PATENT DOCUMENTS

2006/0218252 A1*  9/2006 Ford ................... H04L 61/2015
                                                              709/220
2008/0008197 A1*  1/2008 Sakanashi .......... H04L 61/2015
                                                              370/401
2014/0122395 A1*  5/2014 Nahum ............... H04L 41/0886
                                                              706/13

OTHER PUBLICATIONS

Droms et al., RFC 3315, "Dynamic Host Configuration Protocol for IPv6 (DHCPv6)", Jul. 2003, Network Working Group, p. 1-101.*
Thomson et al., RFC 2462, "IPv6 Stateless Address Autoconfiguration", Dec. 1998, Network Working Group, p. 1-25.*
Droms, "RFC-2131: Dynamic Host Configuration Protocol"; Mar. 1997, Network Working Group, p. 1-45.*
Z. Liu, J. Dong, Y. Cui and C. Zhang, "Dynamic configuration for IPv4/IPv6 address mapping in 4over6 technology," 2015 IEEE 9th International Conference on Anti-counterfeiting, Security, and Identification (ASID), Xiamen, 2015, pp. 132-136. (Year: 2015).*
"Avaya IP Telephone Configuration File Template." Aug. 29, 2013.

\* cited by examiner

*Primary Examiner* — Taylor A Elfervig

(57) ABSTRACT

Embodiments disclosed herein provide systems, methods, and computer readable media for extending the lifetime of a network address when an address system is unavailable. In a particular embodiment, a method provides, upon determining that a first network address for a network element has reached a preferred lifetime for the first network address, transitioning the network element to an extended rebind state that allows the first network address to remain in the preferred state. While the network element is in the extended rebind state, the method provides attempting to contact an address system and determining whether a second network element is assigned the first network address. The method further provides maintaining the first network address in the preferred state and the network element in the extended rebind state until contact is made with the address system or the second network element is determined to be assigned the first network address.

20 Claims, 5 Drawing Sheets

EXTENDING NETWORK ADDRESS LIFETIME WHEN ADDRESS SYSTEM IS UNAVAILABLE

TECHNICAL FIELD

Aspects of the disclosure are related to the assignment of network addresses to network elements and, in particular, to extending the time in which a network address can be used by a network element when an address system is unavailable.

TECHNICAL BACKGROUND

Address systems, such as Dynamic Host Configuration Protocol (DHCP) servers, manage the assignment of network addresses to elements connected to communication networks. The network elements may be personal computing devices, servers, routers, or any other type of network connected device. Each network element uses their assigned address to exchange communications with other network elements. Once a network address is assigned to an element (sometimes referred to as giving the element a lease on the address), the address has a lifetime in which the address can be used before it needs to be replaced or renewed (i.e. the element's lease on the address is renewed).

As with the initial address assignment to the network element, the address server handles whether the address should be renewed for the network element or should be replaced with a new address. Thus, if the address server becomes unavailable to the network element, then the network element may not be able to renew its current address or receive a new address before the lifetime of its current address is reached. In those situations, the network element will have to release its network address upon elapsing of the address' lifetime, which renders the network element unable to exchange communications until a new address is assigned.

Overview

Embodiments disclosed herein provide systems, methods, and computer readable media for extending the lifetime of a network address when an address system is unavailable. In a particular embodiment, a method provides, upon determining that a first network address for a network element has reached a preferred lifetime for the first network address, transitioning the network element to an extended rebind state that allows the first network address to remain in the preferred state. While the network element is in the extended rebind state, the method provides attempting to contact an address system and determining whether a second network element is assigned the first network address. The method further provides maintaining the first network address in the preferred state and the network element in the extended rebind state until contact is made with the address system or the second network element is determined to be assigned the first network address.

In some embodiments, upon contacting the address system, the method provides receiving a renewal of the first address from the address system and, responsively, transitioning the network element from the extended rebind state back to a bound state and renewing the designated lifetime of the first network address.

In some embodiments, upon contacting the address system, the method provides receiving a second address from the address system and, after receiving the second address, transitioning the first network address to a deprecated state.

In some embodiments, the method provides releasing the first network address upon determining that the first network address has reached a valid lifetime for the first network address.

In some embodiments, upon determining that the second network element is assigned the first network address, the method provides transitioning the network element to a stopped state wherein the first network address cannot be used for initiating communications by the network element.

In some embodiments, upon determining that the second network element is assigned the first network address, the method provides transferring at least one release message to the address system and, upon not receiving a reply to the at least one release message, releasing the first network address.

In some embodiments, the address system comprises a Dynamic Host Configuration Protocol version 6 (DHCPv6) server and attempting to contact the address system comprises transferring a DHCPv6 solicit request.

In some embodiments, the designated lifetime comprises a preferred lifetime and before the first network address exceeds the preferred lifetime, the method provides transferring a DHCPv6 renew request to the address system and, upon not receiving a response to the DHCPv6 renew request, transferring a DHCPv6 rebind request.

In some embodiments, upon receiving a response to the renew request indicating that the first network address is renewed, the method provides resetting the preferred lifetime of the first network address.

In some embodiments, determining whether the second network element is assigned the first network address comprises performing an Internet Protocol version 6 (IPv6) neighbor discovery based duplicate address detection algorithm.

In another embodiment, a network element that allows for the extension of a network address lifetime is provided having one or more computer readable storage media and a processing system operatively coupled with the one or more computer readable storage media. Program instructions stored on the one or more computer readable storage media, when read and executed by the processing system, direct the processing system to, upon determining that a first network address for the network element has reached a designated lifetime for a preferred state of the first network address, transitioning the network element to an extended rebind state that allows the first network address to remain in the preferred state. While the network element is in the extended rebind state, the program instructions direct the processing system to attempt to contact an address system and determine whether a second network element is assigned the first network address. The program instructions further direct the processing system to maintain the first network address in the preferred state and the network element in the extended rebind state until contact is made with the address system or the second network element is determined to be assigned the first network address.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The various embodiments disclosed herein provide for extending the time in which a network address can be used in a communication network when an address system is unavailable. Typically, a network address that is assigned to a network element has a lifetime in which that network address can be used for communications with the network element before it needs to be renewed or replaced by a new address for the network element. When an address system is unavailable (e.g. disconnected, powered down, malfunctioning, or otherwise unable to renew or assign addresses), a network element's address cannot be renewed or replaced. Rather than letting the network address for an element expire at the end of its lifetime when an address system is unavailable, the network elements described herein allow for the extended use of a network address until a duplicate address is detected for another network element or until contact is made with an address system.

Figure 1:
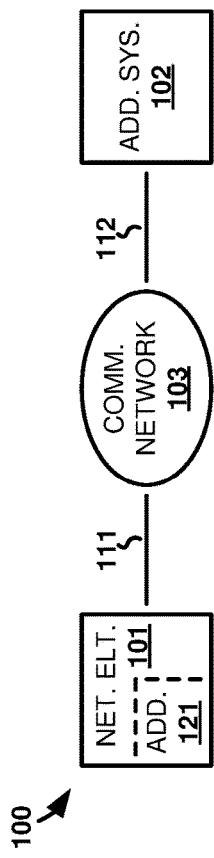
FIG. 1 illustrates a communication environment for extending the lifetime of a network address.

FIG. 1 illustrates communication environment 100 for extending the lifetime of a network address. Communication environment 100 includes network element 101, address system 102, and communication network 103. Network element 101 and communication network 103 communicate over communication link 111. Address system 102 and communication network 103 communicate over communication link 112.

In operation, address system 102 manages network addresses assigned to network elements connected to communication network 103. Such management may help ensure that each network element is assigned a unique network address so that communications can be properly routed to and from network elements based on those unique addresses. The network addresses may be Internet Protocol addresses or may be network addresses of some other type. Likewise, address system 102 may use Dynamic Host Configuration Protocol version 6 (DHCPv6) to manage the network addresses, although, other schemes may also be used. Each network address assigned to a network element has a designated lifetime (called a preferred lifetime in IPv6) in which the network address can be used as the source address for communications. The network address should be renewed by address system 102 or replaced by address system 102 before the designated lifetime expires. If the designated lifetime expires for an address of a network element before it can be renewed or replaced, as may happen if address system 102 is unavailable, then no new communications can be established with that network element. This effectively cuts off the network element from communicating over communication network 103 until address system 102 assigns a new address.

Figure 2:
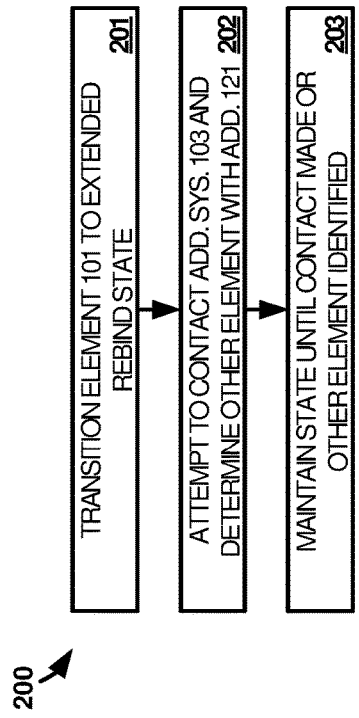
FIG. 2 illustrates a method of operating the communication environment to extend the lifetime of a network address.

FIG. 2 illustrates method 200 of operating communication environment 100 to extend the lifetime of a network address. In this example, network element 101 is assigned network address 121 which is currently in a preferred state. The preferred state is a state in which network element 101 and applications executing thereon have what is essentially full use of network address 121 to exchange communications over communication network 103. Network address 121 has a designated lifetime, which is an amount of time in which network address 121 can remain in the preferred state. The designated lifetime is preferably measured from the time network address 121 last renewed into the preferred state, which may be the time in which network address 121 initially entered the preferred state. The designated lifetime may be set by address system 102, network element 101, a router in communication network 103, or some other element in or connected to communication network 103.

Upon determining that network address 121 for network element 101 has reached the designated lifetime, method 200 provides network element 101 transitioning network element 101 to an extended rebind state that allows the first network address to remain in the preferred state (201). In order for the designated lifetime to have been reached, network element 101 will not have received renewal of network address 121 or a replacement for network address 121 by the time the designated lifetime expired. The extended rebind state allows one or more applications of network element 101 to continue using network address 121 for communications initiated after reaching the designated lifetime.

While network element 101 is in the extended rebind state, method 200 provides network element 101 attempting to contact an address system and determining whether another network element is assigned network address 121 (202). The address system may be address system 102 specifically or network element 101 may transmit solicit messages to any address system on communication network 103. In the latter case, multiple address systems may be connected to communication network 103 and network element 101 may be able to contact one of those other address systems should address system 102 be unavailable. A duplicate address detection (DAD) process may be used to determine whether another element is using network address 121 but other methods may be used instead.

Method 200 further provides maintaining the first network address in the preferred state and network element 101 in the extended rebind state until contact is made with an address system or another network element is determined to be assigned network address 121 (203). The extended rebind state advantageously allows for network element 101 to continue using network address 121 in the preferred state until an address system can be contacted to renew network address 121 or provide a new address, or until another network element is determined to also be using network address 121. As noted above, network addresses should be unique to each device and communications may not be properly routed if more than one network element is using network address 121. Thus, when another network element is determined to be using network address 121, network element 101 should no longer maintain itself in the extended rebind state and network address 121 in the preferred state, as network element 101 should no longer use network address 121 in competition with the other network element.

Figure 3:
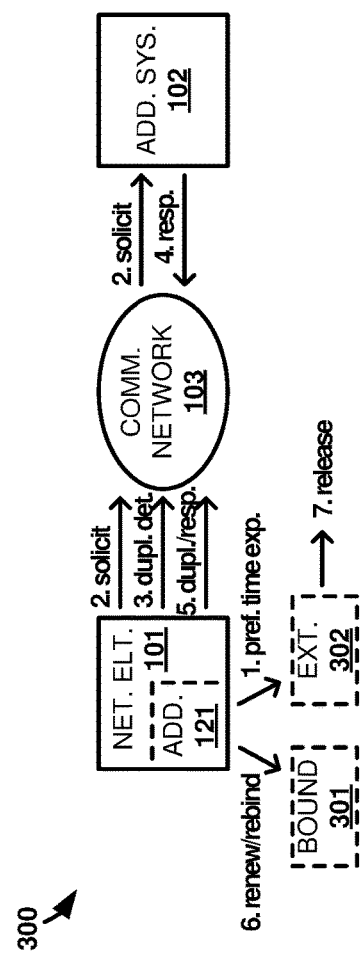
FIG. 3 illustrates an operational scenario of the communication environment to extend the lifetime of a network address.

FIG. 3 illustrates operational scenario 300 of communication environment 100 to extend the lifetime of a network address. As in method 200, in the example of operational scenario operational scenario 300, network element 101 is assigned network address 121 which is currently in preferred state 301. At step 1, the designated lifetime of network address 121 is reached, and therefore expires, and network element 101 transitions into extended rebind state 302. Steps 2 and 3 are performed while network element 101 is in extended rebind state 302. Specifically, step 2 transfers solicit messages to communication network 103 in an attempt to connect with an address system. The solicit messages may be transferred periodically until an address system responds to a solicit message at step 4, if an address system ever responds. While the solicit message is shown reaching address system 102 at step 2, the solicit message may never reach address system 102, as may be the case if address system 102 is unavailable due to a connection issue with communication network 103.

If a duplicate address is detected or a response from an address system is received at step 5, network element 101 is transitioned from extended rebind state 302. Specifically, if a response from an address system renews network address 121, then the designated lifetime for network address 121 reset and network element is transition to bound state 301 at step 6. Alternatively, if a duplicate address is detected or if a response from an address system provides a new network address, network address 121 is released by network element 101 at step 7. In some cases, one or more states, such as a deprecated state, may be used for network address 121 before network address 121 is actually released. Otherwise, if no response is received from an address system and no duplicate address is detected, then network element 101 may remain in extended rebind state 302 indefinitely, which allows network address 121 to likewise remain in the preferred state indefinitely.

Referring back to FIG. 1, network element 101 comprises a computer processor system and a communication interface. Network element 101 may also include other components such as a router, server, data storage system, and power supply. Network element 101 may each reside in a single device or may be distributed across multiple devices. Network element 101 may be a telephone, computer, tablet, conference room system, e-book, mobile Internet appliance, network interface card, media player, game console, application server, proxy server, or some other network communication apparatus—including combinations thereof.

Address system 102 comprises a computer processor system and communication interface. Address system 102 may also include other components such as a router, server, data storage system, and power supply. Address system 102 may reside in a single device or may be distributed across multiple devices. Address system 102 may be a Dynamic Host Configuration Protocol version 6 (DHCPv6) server or some other computing system for assigning network addresses—including combinations thereof.

Communication network 103 comprises network elements that provide communications services to connected network elements, including network element 101 and address system 102. Communication network 103 may comprise switches, wireless access nodes, Internet routers, network gateways, application servers, computer systems, communication links, or some other type of communication equipment—including combinations thereof. Communication network 103 may be a single network, such as a local area network, a wide area network, or the Internet, or may be a combination of multiple networks.

Communication links 111-112 use metal, glass, air, space, or some other material as the transport media. Communication links 111-112 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-112 could be direct links or may include intermediate networks, systems, or devices.

Figure 4:
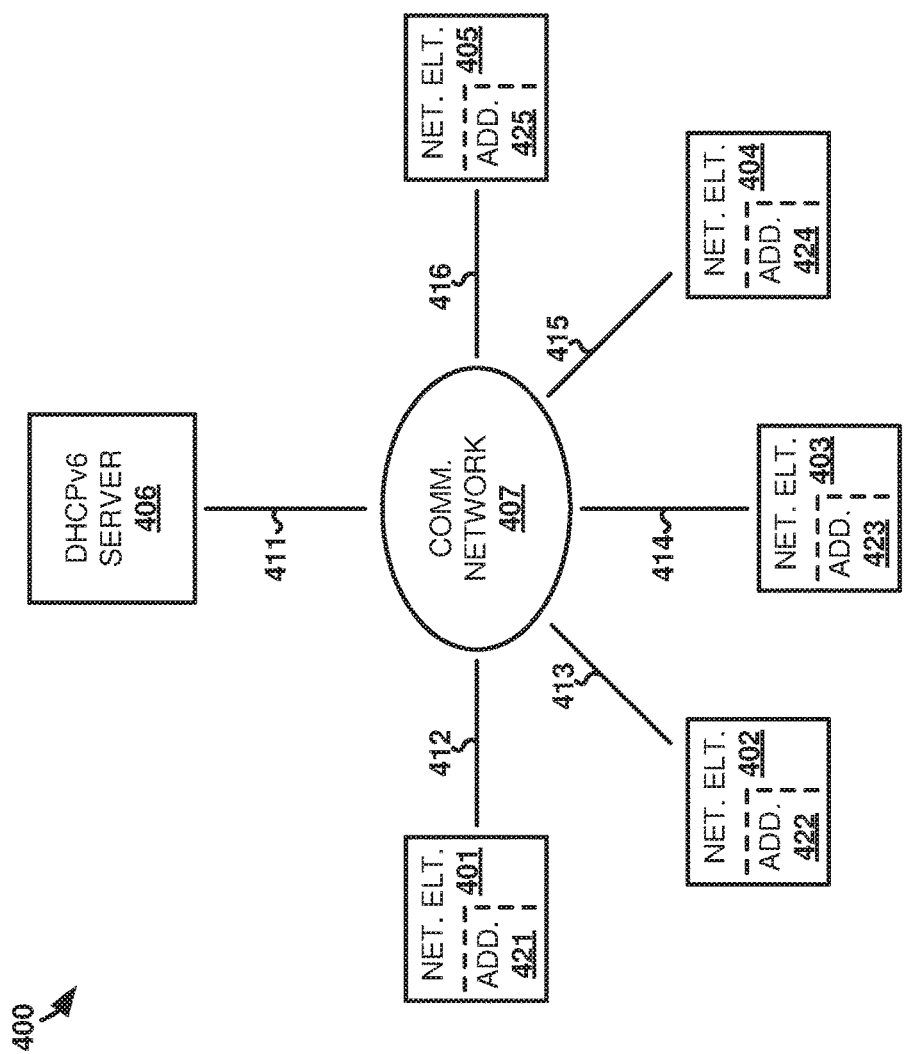
FIG. 4 illustrates another communication environment for extending the lifetime of a network address.

FIG. 4 illustrates communication environment 400 for extending the lifetime of a network address. Communication environment 400 includes network elements 401-405, DHCP version 6 (DHCPv6) server 406, and communication network 407. Network elements 401-405 and DHCPv6 server 406 communicate with communication network 407 over communication links 411-416, respectively.

In operation, DHCPv6 server 406 uses the DHCPv6 protocol to manage Internet Protocol version 6 (IPv6) addresses assigned to network elements connected to communication network 407. Specifically, each network elements 401-405 are assigned IPv6 addresses 421-425 and DHCPv6 server 406 controls whether those addresses are renewed, reassigned to other network elements, or released by network elements 401-405.

Figure 5:
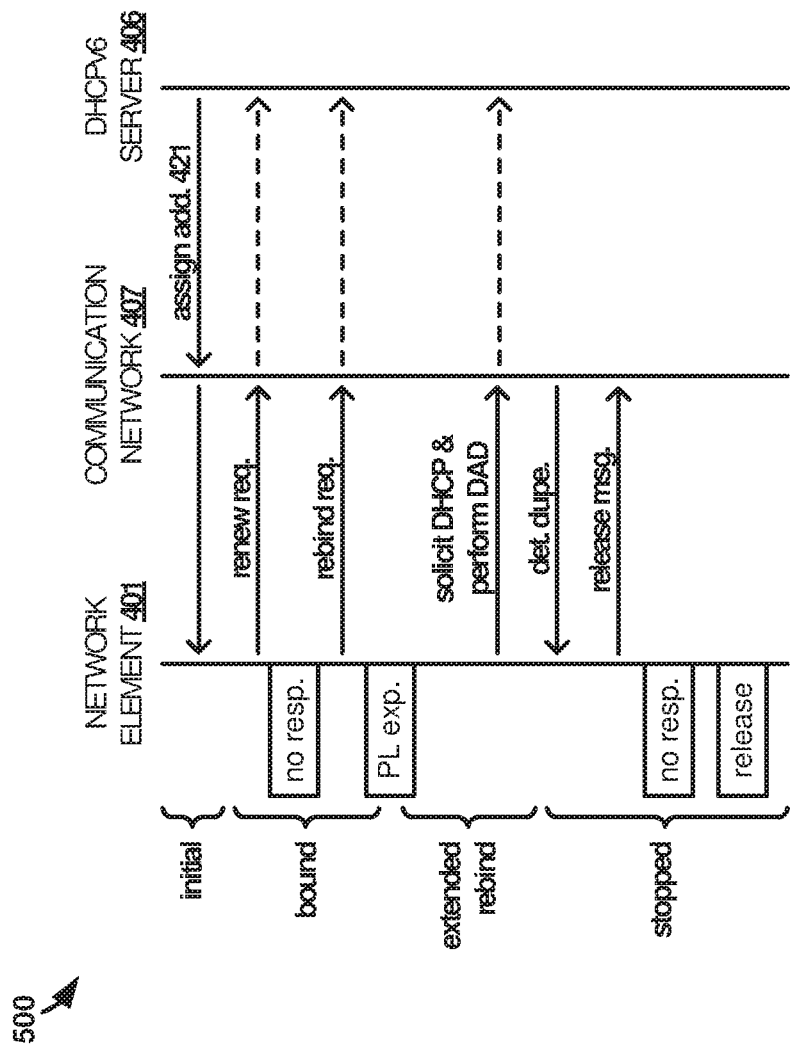
FIG. 5 illustrates an operational scenario of the other communication environment to extend the lifetime of a network address.

FIG. 5 illustrates operational scenario 500 of communication environment 400 to extend the lifetime of a network address. In particular, operational scenario 500 is presented with respect to network element 401 but the other network elements 402-405 may operate in the same manner. Operational scenario 500 tracks the state of an IPv6 address 421 from when it is initially assigned to network element 401 through a period when DHCPv6 server 406 becomes unavailable. Specifically, network element 401 begins in an initial state wherein it will be assigned a new network address. When IPv6 address 421 is assigned to network element 401 by DHCPv6 server 406, IPv6 address 421 is placed in a tentative state. IPv6 address 421 may be assigned to network element 401 as an initial address upon network element 401 connecting to communication network 407 or may be assigned to replace another address previously assigned to network element 401 (in the latter case network element 401 will not necessarily be in the initial state since it is not first connecting to communication network 407). The state of IPv6 address 421 is considered tentative because network element 401 will perform duplicate address detection (DAD) to ensure no other network elements are using the same address as IPv6 address 421 before placing IPv6 address 421 into a preferred state. If a duplicate address is detected (e.g. one of IPv6 addresses 422-425 of network elements 402-405), then network element 401 will request a new address from DHCPv6 server 406.

However, if no duplicate addresses are detected, IPv6 address 421 is transitioned to a preferred state wherein applications running on network element 401 can use IPv6 address 421 when establishing and maintaining communications with other network elements on communication network 407, which include but are not limited to network elements 402-405 in communication environment 400. Once an address is transitioned to the preferred state, the state of network element 401 transitions to a bound state. While IPv6 address 421 is in the preferred state, network element 401 tracks a preferred lifetime of IPv6 address 421. The length of time defined by the preferred lifetime may be preconfigured in network element 401, may be assigned by DHCPv6 server 406, or may be determined from some other source. The elapsing of the preferred lifetime begins when IPv6 address 421 enters the preferred state.

Before the preferred lifetime of IPv6 address 421 expires (i.e. the amount of time defined thereby is reached), network element 401 transfers a DHCPv6 RENEW request to DHCPv6 server 406. If the request is received by DHCPv6 server 406 and a response from DHCPv6 server 406 renewing IPv6 address 421 is received by network element 401, then IPv6 address 421 essentially will reenter the preferred state and the elapsing of the preferred lifetime will be reset accordingly. However, if no response is received by network element 401 from DHCPv6 server 406, then network element 401 will transfer a DHCPv6 REBIND request to DHCPv6 server 406. A response to the RENEW request may not be received due to the request never reaching DHCPv6 server 406, due to DHCPv6 server 406 malfunctioning, due to the response, though sent by DHCPv6 server 406, never reaching network element 401, or for some other reason that DHCPv6 server 406 may be unavailable to network element 401. The REBIND request is transferred in an attempt to rebind network element 401 with DHCPv6 server 406 after not receiving a response to the RENEW request. If a response to the REBIND request is received by network element 401, then DHCPv6 server 406 is no longer unavailable and IPv6 address 421 can be renewed or replaced with a new address in due course. If no response to the REBIND request is received by the time the preferred lifetime of IPv6 address 421 is reached, then network element 401 transitions into an extended rebind state while allowing IPv6 address 421 to remain in the preferred state. As with the RENEW request, a response to the REBIND request may not be received due to the request never reaching DHCPv6 server 406, due to DHCPv6 server 406 malfunctioning, due to the response, though sent by DHCPv6 server 406, never reaching network element 401, or for some other reason that DHCPv6 server 406 may be unavailable to network element 401.

The extended rebind state is a state of a DHCPv6 network element that allows the address to remain in the preferred address state for use by applications on the network element. The extended rebind state is a new state and is not defined in any network standards. As such, applications on network element 401 can continue to communicate using IPv6 address 421 when IPv6 address 421 would have otherwise been transitioned into a deprecated state. While network element 401 is in the extended rebind state, network element 401 transfers one or more DHCPv6 SOLICIT messages in an attempt to establish a connection with a DHCPv6 server. When sending SOLICIT messages, network element 401 may be looking for any DHCPv6 server on communication network 407 that can update IPv6 address 421, not necessarily just DHCPv6 server 406. If a DHCPv6 server responds while network element 401 is in the extended rebind state, then a DHCPv6 server is no longer unavailable to network element 401 and network element 401 can request an address update accordingly.

Additionally, while network element 401 is in the extended rebind state, network element 401 uses an IPv6 neighbor discovery based DAD algorithm to determine whether any other network elements on communication network 407 are using the same IPv6 address as IPv6 address 421 while network element 401 is in the extended rebind state. Should DAD detect that another network element is using the same address as IPv6 address 421 (e.g. one of IPv6 addresses 422-425 is the same as IPv6 address 421) before any response is received from a DHCPv6 server, then network element 401 transitions into a stopped state and transitions IPv6 address 421 out of the preferred state. In the stopped state, IPv6 address 421 can no longer be used as the source address for communications by applications on network element 401 since another element, which may be in contact with a DHCPv6 server, is assigned the same address. Thus, to avoid conflicts with the communications of that other element, network element 401 stops using IPv6 address 421.

While in the stopped state, network element 401 transmits a DHCPv6 RELEASE message to any DHCPv6 server that may become available at that time informing that server that network element 401 is releasing IPv6 address 421. If no response to the message is received from a DHCPv6 server, then IPv6 address 421 is no longer valid for use by network element 401 and IPv6 address 421 is transitioned to an invalid state where it will be released (i.e. IPv6 address 421's lease on IPv6 address 421 is removed). Network element 401 may send multiple release messages or wait an amount of time before not receiving a response from a DHCPv6 server before determining that IPv6 address 421 should transition to the invalid state for release. After release of IPv6 address 421, network element 401 will progress into an initial state, which is the state network element 401 is in when first connecting to communication network 407, to continue soliciting a DHCPv6 server in attempts to receive a new address. If a reply is received from a DHCPv6 server while network element 401 is in the stopped state, then IPv6 address 421 is transitioned to the invalid state and then released. Network element 401 returns to the initial state at the beginning of operational scenario 500 and requests a new address from the DHCPv6 server.

Figure 6:
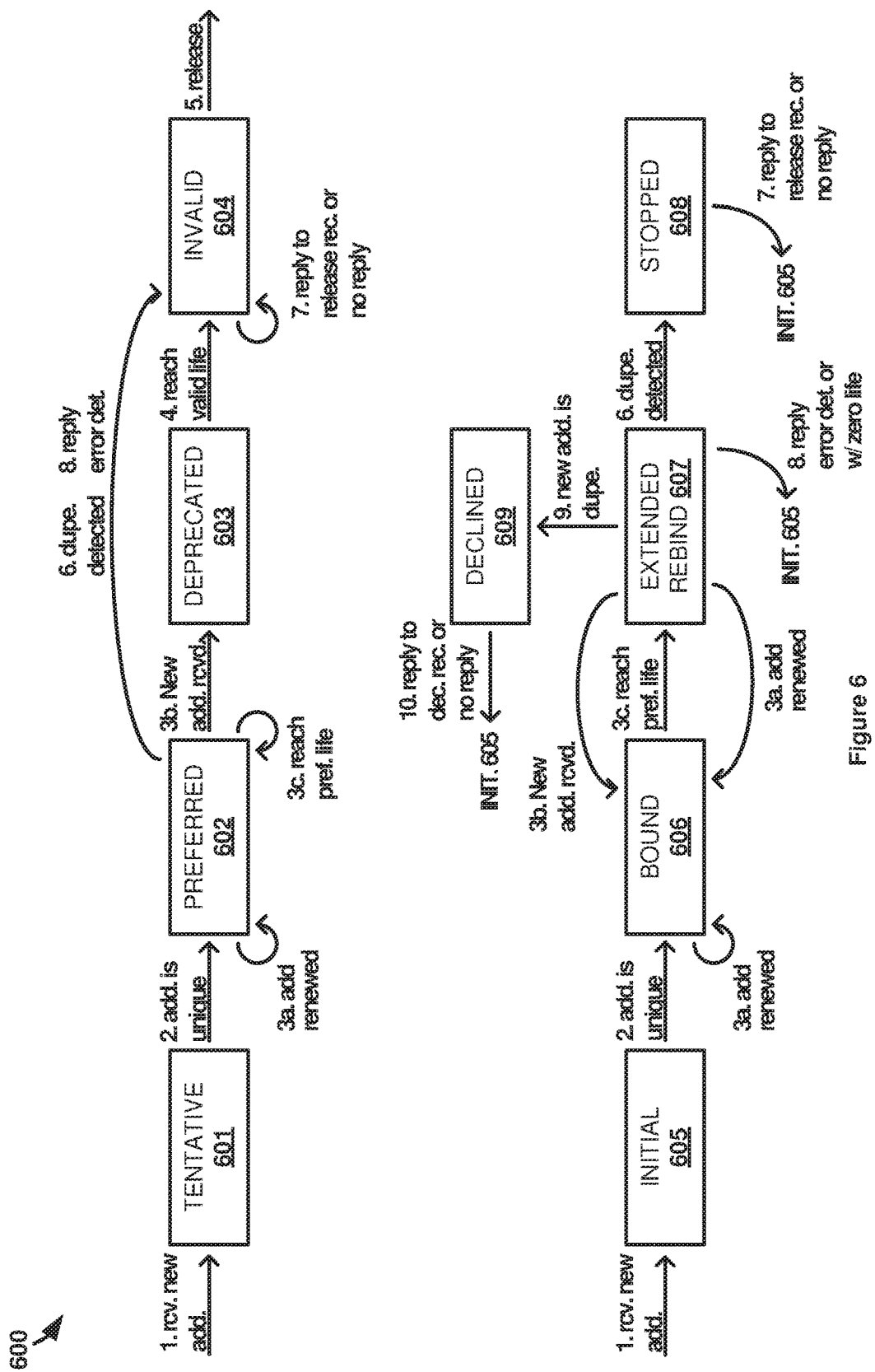
FIG. 6 illustrates another operational scenario of the other communication environment to extend the lifetime of a network address.

FIG. 6 illustrates operational scenario 600 of the other communication environment to extend the lifetime of a network address. Operational scenario 600 is shown from the perspective of possible address states for IPv6 address 421 and DHCPv6 states for network element 401. The possible address states are tentative state 601, preferred state 602, deprecated state 603, and invalid state 604 while the possible DHCPv6 states for network element 401 while assigned the address are initial state 605, bound state 606, extended rebind state 607, stopped state 608, and declined state 609. At step 1, a new address for IPv6 address 421 is received from DHCPv6 server 406 while network element 401 is in the initial state and IPv6 address 421 is placed in tentative state 601. New IPv6 address 421 may be received to replace another address previously used by network element 401 or may be an initial address assigned to network element 401 upon connection to communication network 407. While IPv6 address 421 is in tentative state 601, network element 401 performs DAD to determine whether newly received IPv6 address 421 is being used by any other network elements on communication network 407. If IPv6 address 421 is determined to be a duplicate of another address, then network element 401 will have to request another address from DHCPv6 server 406 and return to step 1 to receive the other new address.

At step 2 IPv6 address 421 is determined to be unique and IPv6 address 421 is transitioned to preferred state 602. Network element 401 is similarly transitioned to bound state 606 at step 2. Upon entering preferred state 602, applications on network element 401 are informed by network element 401 that they are to use IPv6 address 421 to initiate and receive new communications over communication network 407 (i.e. to use IPv6 address 421 as their source address). While IPv6 address 421 is in preferred state 602 and before a preferred lifetime of IPv6 address 421 is reached, network element 401 transfers RENEW requests to DHCPv6 server 406 in attempts to renew network element 401's lease on IPv6 address 421 and thereby reset the preferred lifetime in which IPv6 address 421 will remain in preferred state 602. If a response is received that renews IPv6 address 421, at step 3a the preferred lifetime is reset for IPv6 address 421 and IPv6 address 421 remains in preferred state 602 while network element 401 remains in bound state 606.

Alternatively, a new address may be received while IPv6 address 421 is in preferred state 602, that new address will start operational scenario 600 over at step 1 while IPv6 address 421 is transitioned to deprecated state 603 at step 3b. While in deprecated state 603, IPv6 address 421 can no longer be used by applications on network element 401 for establishing new communications, although, can still be used for already established communications so as to not cut off those communications before they can complete or be changed over to the new address. Once a valid lifetime for IPv6 address 421 is reached, IPv6 address 421 is transitioned to invalid state 604 at step 4 where it can no longer be used for communications and must be released at step 5. The valid lifetime of IPv6 address 421, like IPv6 address 421's preferred lifetime, may be defined by a DHCPv6 server, preset in network element 401, received from some other network element, or defined in some other manner.

Referring back to when IPv6 address 421 was in preferred state 602, DHCPv6 server 406 may not be available to respond to any of network element 401's renew or rebind requests regarding IPv6 address IPv6 address 421 before the preferred lifetime of IPv6 address 421 is reached. If that is the case, rather than transitioning IPv6 address 421 into deprecated state 603 when no response is received, network element 401 transitions into extended rebind state 607 at step 3c and allows IPv6 address 421 to remain in preferred state 602. Extended rebind state 607 allows applications on network element 401 to continue using IPv6 address 421 in preferred state 602 while network element 401 continues to solicit a DHCPv6 server for renewal of IPv6 address 421's lease or a new address.

While in extended rebind state 607, network element 401 may regain a connection with a DHCPv6 server, whether that server is DHCPv6 server 406 or some other DHCPv6 server on communication network 407. If IPv6 address 421 is renewed by that DHCPv6 server, then IPv6 address 421 remains in preferred state 602 and its preferred lifetime is reset just as it was in step 3a. Alternatively, that DHCPv6 server may provide network element 401 with a new address to replace IPv6 address 421. In that case, the new address starts operational scenario 600 over at step 1, while IPv6 address 421 is transitioned to deprecated state 603 just like it was at step 3b.

Additionally, while network element 401 is in extended rebind state 607, network element 401 handles error codes in reply messages (e.g. IAaddr-option status-code errors or zero address lifetimes) in the same manner as it would in initial state 605. With reply error handling (e.g. a reply is received with no lifetime remaining for IPv6 address 421), a DHCPv6 server is reachable but IPv6 address 421 is transitioned to invalid state 604 while network element 401 is transitioned from extended rebind state 607 back to initial state 605 at step 8. When back in initial state 605, network element 401 solicits the DHCPv6 server that transferred the reply for a new address.

If a reply renewing IPv6 address 421 is received from a DHCPv6 server while network element 401 is in extended rebind state 607 and the lifetime of IPv6 address 421 is nonzero, then the preferred lifetime of IPv6 address 421 is renewed and network element 401 transitions to bound state 606 at step 3a. Alternatively, if the DHCPv6 server responds with an advertise DHCPv6 message, then network element 401 uses IPv6 address 421 to request a new address, DAD is performed on that new address and, if no duplicate is detected, the new address is transitioned into preferred state 602 while network element 401 transitions from extended rebind state 607 to bound state 606 at step 3b. Similarly, if the initial reply from the DHCPv6 server includes a new address, IPv6 address 421 is transitioned to deprecated state 603 at step 3b while the new address is placed in tentative state 601. If the new address is found to be a duplicate while in tentative state 601, then network element 401 transitions to declined state 609 at step 9. Network element 401 informs the DHCPv6 server that the new address is declined and, upon receiving a reply from the DHCPv6 server or after a timeout from not receiving a reply at step 10, network element 401 transitions back to initial state 605 to obtain another new address.

While IPv6 address 421 may remain in preferred state 602 and network element 401 in extended rebind state 607 indefinitely while network element 401 attempts to contact a DHCPv6 server, network element 401 also performs DAD while in extended rebind state 607. If network element 401 detects a duplicate address to IPv6 address 421 being used by another network element before contact can be made with a DHCPv6 server, then IPv6 address 421 is transitioned to invalid state 604 at step 6 so that it can no longer be used by applications to communicate. Likewise, at step 6, network element 401 is transitioned to stopped state 608. While network element 401 is in stopped state 606, applications on network element 401 cannot use IPv6 address 421 for communications but network element 401 continues its attempts to contact a DHCPv6 server by sending out messages indicating that IPv6 address 421 is going to be released.

If a DHCPv6 server is still unreachable by network element 401 after a set amount of release messages (e.g. 5 release messages for release timeout) or a reply acknowledging release is received before that release timeout at step 7, then IPv6 address 421 is released at step 5. Network element 401 then goes back to initial state 605 at step 7 wherein network element 401 attempts to contact a DHCPv6 server for an address while applications on network element 401 are unable to establish communications by virtue of not having a valid address to use. Specifically, network element 401 sends solicit messages upon returning to initial state 605 using an exponential back-off algorithm till a predetermined amount of time has been reached (e.g. 120 seconds). Alternatively, if a reply is received from a DHCPv6 server while network element 401 is in stopped state 608, then IPv6 address 421 is released at step 5 and network element 401 returns to initial state 605 at step 7 wherein network element 401 is able to solicit a new address from the DHCPv6 server that sent the reply.

Figure 7:
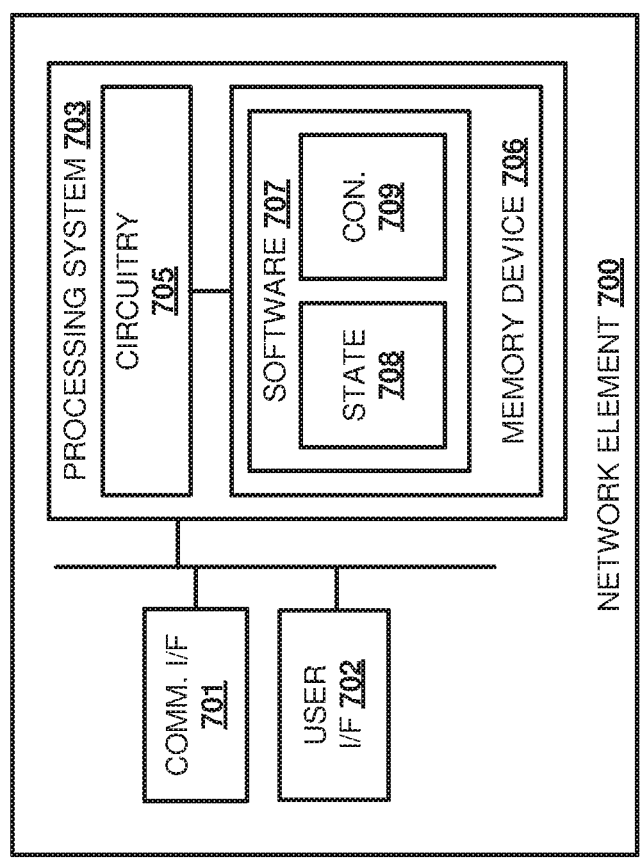
FIG. 7 illustrates a computing architecture for implementing a network element to extend the lifetime of a network address.

FIG. 7 illustrates network element 700. Network element 700 is an example of network element 101, although network element 101 may use alternative configurations. Network element 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof. In some embodiments, a communication interface, such as a network card, may itself be considered a network element. In those cases, processing system 703 may be included within communication interface 701.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes address state module 708 and contact module 709. Operating software 707 may further include an operating system, utilities, drivers, network interfaces, applications, or some other type of software. When executed by circuitry 705, operating software 707 directs processing system 703 to operate network element 700 as described herein.

In particular, address state module 708 directs processing system 703 to, upon determining that a first network address for a network element has reached a designated lifetime for a preferred state of the first network address, transitioning the network element to an extended rebind state that allows the first network address to remain in the preferred state. While the network element is in the extended rebind state, contact module 709 directs processing system 703 to attempt to contact an address system and determine whether a second network element is assigned the first network address. Address state module 708 further directs processing system 703 to maintain the first network address in the preferred state and the network element in the extended rebind state until contact is made with the address system or the second network element is determined to be assigned the first network address.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method extending network address lifetime, the method comprising:
    upon determining that a first network address for a network element has reached a designated lifetime for a preferred state of the first network address, transitioning the network element to an extended rebind state that allows the first network address to remain in the preferred state;
    while the network element is in the extended rebind state, attempting to contact an address system and determining whether a second network element is assigned the first network address; and
    maintaining the first network address in the preferred state and the network element in the extended rebind state until contact is made with the address system or the second network element is determined to be assigned the first network address.

2. The method of claim 1, further comprising:
    upon contacting the address system, receiving a renewal of the first address from the address system and, responsively, transitioning the network element from the extended rebind state back to a bound state and renewing the designated lifetime of the first network address.

3. The method of claim 1, further comprising:
    upon contacting the address system, receiving a second address from the address system; and
    after receiving the second address, transitioning the first network address to a deprecated state.

4. The method of claim 3, further comprising:
    releasing the first network address upon determining that the first network address has reached a valid lifetime for the first network address.

5. The method of claim 1, further comprising:
    upon determining that the second network element is assigned the first network address, transitioning the network element to a stopped state wherein the first network address cannot be used for initiating communications by the network element.

6. The method of claim 5, further comprising:
    upon determining that the second network element is assigned the first network address, transferring at least one release message to the address system; and
    upon not receiving a reply to the at least one release message, releasing the first network address.

7. The method of claim 1, wherein the address system comprises a Dynamic Host Configuration Protocol version 6 (DHCPv6) server and attempting to contact the address system comprises:
    transferring a DHCPv6 solicit request.

8. The method of claim 7, wherein the designated lifetime comprises a preferred lifetime, and the method further comprising:
    before the first network address exceeds the preferred lifetime, transferring a DHCPv6 renew request to the address system; and
    upon not receiving a response to the DHCPv6 renew request, transferring a DHCPv6 rebind request.

9. The method of claim 8, further comprising:
    upon receiving a response to the renew request indicating that the first network address is renewed, resetting the preferred lifetime of the first network address.

10. The method of claim 1, wherein determining whether the second network element is assigned the first network address comprises:
   performing an Internet Protocol version 6 (IPv6) neighbor discovery based duplicate address detection algorithm.

11. A network element that allows for the extension of a network address lifetime, the network element comprising:
   one or more computer readable storage media;
   a processing system, comprising processing circuitry, operatively coupled with the one or more computer readable storage media; and
   program instructions stored on the one or more computer readable storage media that, when read and executed by the processing system, direct the processing system to:
      upon determining that a first network address for the network element has reached a designated lifetime for a preferred state of the first network address, transitioning the network element to an extended rebind state that allows the first network address to remain in the preferred state;
      while the network element is in the extended rebind state, attempt to contact an address system and determine whether a second network element is assigned the first network address; and
      maintain the first network address in the preferred state and the network element in the extended rebind state until contact is made with the address system or the second network element is determined to be assigned the first network address.

12. The network element of claim 11, wherein the program instructions further direct the processing system to:
   upon contacting the address system, receive a renewal of the first address from the address system and, responsively, transition the network element from the extended rebind state back to a bound state and renewing the designated lifetime of the first network address.

13. The network element of claim 11, wherein the program instructions further direct the processing system to:
   upon contacting the address system, receive a second address from the address system; and
   after receiving the second address, transition the first network address to a deprecated state.

14. The network element of claim 13, wherein the program instructions further direct the processing system to:
   release the first network address upon determining that the first network address has reached a valid lifetime for the first network address.

15. The network element of claim 11, wherein the program instructions further direct the processing system to:
   upon determining that the second network element is assigned the first network address, transition the network element to a stopped state wherein the first network address cannot be used for initiating communications by the network element.

16. The network element of claim 15, wherein the program instructions further direct the processing system to:
   upon determining that the second network element is assigned the first network address, transfer at least one release message to the address system; and
   upon not receiving a reply to the at least one release message, release the first network address.

17. The network element of claim 11, wherein the address system comprises a Dynamic Host Configuration Protocol version 6 (DHCPv6) server and to attempt to contact the address system the program instructions direct the processing system to:
   transfer a DHCPv6 solicit request.

18. The network element of claim 17, wherein the designated lifetime comprises a preferred lifetime, and wherein the program instructions further direct the processing system to:
   before the first network address exceeds the preferred lifetime, transfer a DHCPv6 renew request to the address system; and
   upon not receiving a response to the DHCPv6 renew request, transfer a DHCPv6 rebind request.

19. The network element of claim 18, wherein the program instructions further direct the processing system to:
   upon receiving a response to the renew request indicating that the first network address is renewed, reset the preferred lifetime of the first network address.

20. The network element of claim 11, wherein to determine whether the second network element is assigned the first network address the program instructions direct the processing system to:
   perform an Internet Protocol version 6 (IPv6) neighbor discovery based duplicate address detection algorithm.

\* \* \* \* \*